United States Patent

Tsuji

[15] 3,644,684

[45] Feb. 22, 1972

[54] CASSETTE TO CARTRIDGE TAPE PLAYER ADAPTER UNIT WITH SELF-CONTAINED DRIVE MECHANISM

[72] Inventor: Tom T. Tsuji, Monterey Park, Calif.

[73] Assignee: California Auto Radio, Inc.

[22] Filed: July 25, 1969

[21] Appl. No.: 844,770

[52] U.S. Cl. ....................179/100.2 Z, 242/59.19 R, 274/4 C

[51] Int. Cl. ....................G11b 23/04

[58] Field of Search ...............179/100.2 Z, 100.11, 100.1 A; 242/197, 198, 55.19

[56] References Cited

UNITED STATES PATENTS

| | | | |
|---|---|---|---|
| 3,531,127 | 9/1970 | Harper | 179/100.2 Z |
| 3,521,010 | 7/1970 | Sato | 179/100.2 Z |
| 3,410,470 | 12/1968 | Metzner | 179/100.2 Z |

*Primary Examiner*—Bernard Konick
*Assistant Examiner*—Alfred H. Eddleman
*Attorney*—Fraser and Bogucki

[57] ABSTRACT

For a preexisting player system having a recess for receiving a magnetic tape cartridge, an adapter unit for playing and recording on magnetic tape cassettes is arranged to cooperate with both the mechanical drive and the electrical playback parts of the preexisting system. A housing having a portion configured to register within the cartridge-receiving recess includes an upper cassette insert position, for top-loading of a cassette tape in operative relation to a takeup drive spindle and a tape drive capstan. When the unit is inserted into the recess of the preexisting system, both the adapter capstan and takeup reel are rotated. Rotational power may be derived through a belt drive system connected with an internal roller in engagement with the capstan of the preexisting system. To record, signals from a microphone are amplified within the unit. During playback, signals derived from the playback head are preamplified within the adapter unit and energize the existing playback system through a transducer magnetically coupled to the cartridge playback head. Electrical power may be derived from the preexisting system.

The unit may alternatively contain its own drive motor, powered from the preexisting system in compact configurations having a portion registrable within the cartridge receptacle and a compact protruding portion permitting cassette top loading. Adapter units may be equipped with their own battery pack, amplifiers and loudspeakers to function as a cassette tape record and playback system outside of the preexisting tape cartridge playback system.

8 Claims, 9 Drawing Figures

FIG. — I

INVENTOR.
TOM T. TSUJI
BY
FRASER & BOGUCKI
ATTORNEYS

INVENTOR.
TOM T. TSUJI

BY Fraser & Bogucki

ATTORNEYS

INVENTOR.
TOM T. TSUJI

BY

FRASER & BOGUCKI

ATTORNEYS

INVENTOR.
TOM T. TSUJI
BY
FRASER & BOGUCKI
ATTORNEYS

CASSETTE TO CARTRIDGE TAPE PLAYER ADAPTER UNIT WITH SELF-CONTAINED DRIVE MECHANISM

BACKGROUND OF THE INVENTION

This invention relates to tape cartridge playback systems, and particularly to improvements in such systems which provide a capability for using tape cassettes for record or playback or both without modification of such systems.

Tape cartridge systems, particularly those installed in automobiles, have become widely used for a number of reasons, including relatively low equipment costs, ease of handling the record medium, and the availability at relatively low cost of a wide variety of recorded material. These systems embody four-track and eight-track endless loop cartridges, both of which employ endless tape loops in which a tape is withdrawn from the innermost turn of a reel, passed across the playback head system, and returned to the outermost turn. The tape cartridge units are generally rectangular in shape, only a few inches wide and deep, and less than an inch in height. Generally use of these cartridges is restricted to playback of prerecorded material along and excludes recording, because the endless loop arrangement makes it extremely difficult to locate desired recorded material.

Another source of prerecorded tapes is the cassette, in which tape is wound between a supply and a takeup reel very compactly disposed within a small housing approximately three-eighths inch in height, and 1½ inch in depth by 2½ inch in width. The cassette includes a symmetrical arrangement of takeup and reel hubs, and an aperture for a pin-type capstan, together with openings along one side adjacent which the tape passes in engagement with record and playback heads. Thus, after tape is fed in one direction from the supply reel to the takeup reel on one side, the cassette may simply be turned over and the functions of these reels reversed in recording or playing back the tape, in the opposite direction, to its original position on the reels. Because of their small size, low-friction design, relatively low cost, and their convenience for use in recording, cassette tapes and portable and fixed cassette players have gained wide popularity.

Many existing monaural and stereo systems, including those installed in automobiles and other vehicles are of the earlier cartridge type. Because of the different positions of the drive capstan and the magnetic head in cartridge and cassette systems, as well as the different sizes in shapes of the cassette and cartridge, it is not feasible to attempt modification of an existing cartridge system. Instead, it is preferably to utilize the existing system, if possible, to cooperate with cassette-type units.

SUMMARY OF THE INVENTION

The purposes and objects of the present invention are achieved by a cassette adapter unit comprising a cassette record and playback system. The unit has a housing having a portion which is within the cartridge-receiving recess of a preexisting tape cartridge player system and incorporating extremely compact means for receiving and operating a cassette tape. In the housing, means are provided for achieving both mechanical interconnection between the cassette adapter unit drive system and the preexisting drive for the tape cartridge player, and for coupling the adapter unit playback head into the preexisting amplifier system without mechanical or direct electrical interconnection.

In a specific example of a system in accordance with the invention, an adapter unit is provided including an insertable portion having an outline no greater than that of the insertable portion of the tape cartridge. When the adapter is inserted, a front or outer portion extends from the recess and includes a depending under surface, with the interior volume containing a drive for the cassette capstan and the cassette takeup reel spindle. The cassette tape is mounted in operative relationship to these elements on the top portion of the adapter, with at least the forward part of the cassette being exposed. When such an adapter is installed in conjunction, for example, with an automobile stereo playback cartridge system, the depending under portion, which contains the control panel, and the top cassette loading portion offer ready access and control of the system to occupants of the automobile.

Preamplifiers for recording, or playback, or both are disposed in the interior of the housing on one side; a belt and pulley drive system including a pressure roller at the rearward portion of the inserted adapter housing is engaged with the preexisting drive capstan. When inserted and turned on, the unit drives the cassette tape at both the reel spindle and the capstan by frictional drive from the drive capstan of the preexisting cartridge unit. In the playback mode, signal coupling to the existing amplifier unit is made by a magnetic flux coupling transducer disposed adjacent the preexisting magnetic head.

Further aspects of the invention include a simple but reliable belt drive arrangement which provides a limited slip drive of the adapter unit takeup reel while also providing positive drive of the adapter drive capstan. Means may additionally be included for disengaging the cassette to facilitate easy removal when the unit is turned off.

Another specific example of a system in accordance with the invention employs its own self-contained electric motor for mechanical power. In this example, mechanical interconnection between the drive systems for the preexisting cartridge player and the adapter is not required. Such a system may be provided with a separately attachable battery pack, amplifier and speaker system of conventional type for independent operation. An aspect of this specific example of a system in accordance with the invention is simple and effective means for engaging cassette tape reels in forward and rewind directions and in the rewind/playback mode.

Another example of a cassette adapter system in accordance with the invention employs drive system comprising a thin, narrow horizontally mounted motor and a belt-pulley drive transmission unit with a single belt. An aspect of this example is the extreme compactness of the drive system and its simple and trouble-free operation.

BRIEF DESCRIPTION OF THE DRAWINGS

A better understanding of the invention may be had by reference to the following description, in conjunction with the accompanying drawings, in which.

DETAILED DESCRIPTION OF THE INVENTION

Figure 1:
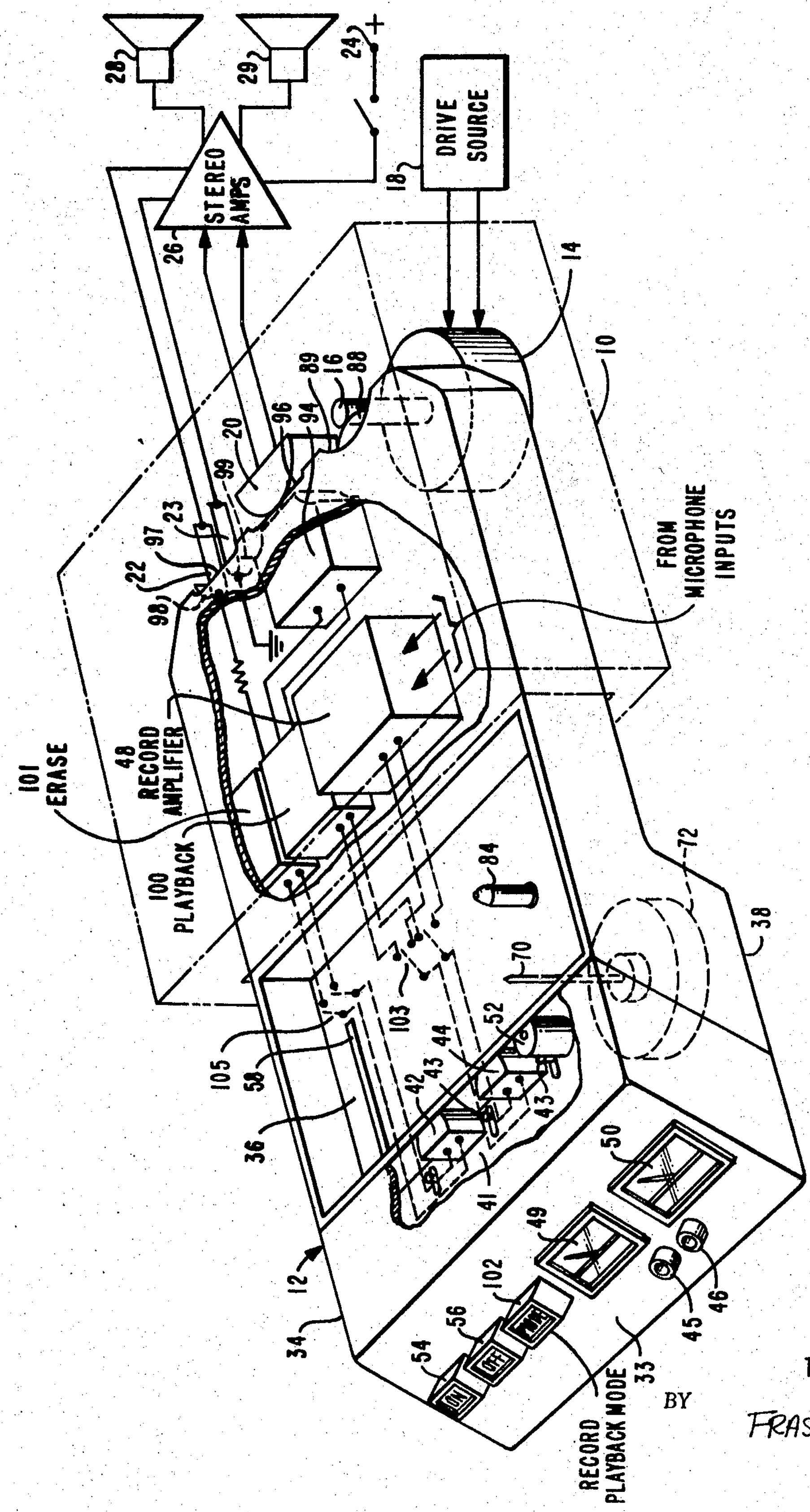
FIG. 1 is a combined perspective and block diagram representation, partially broken away, of a cassette adapter unit and system in accordance with the invention.
Figures 2, 4:
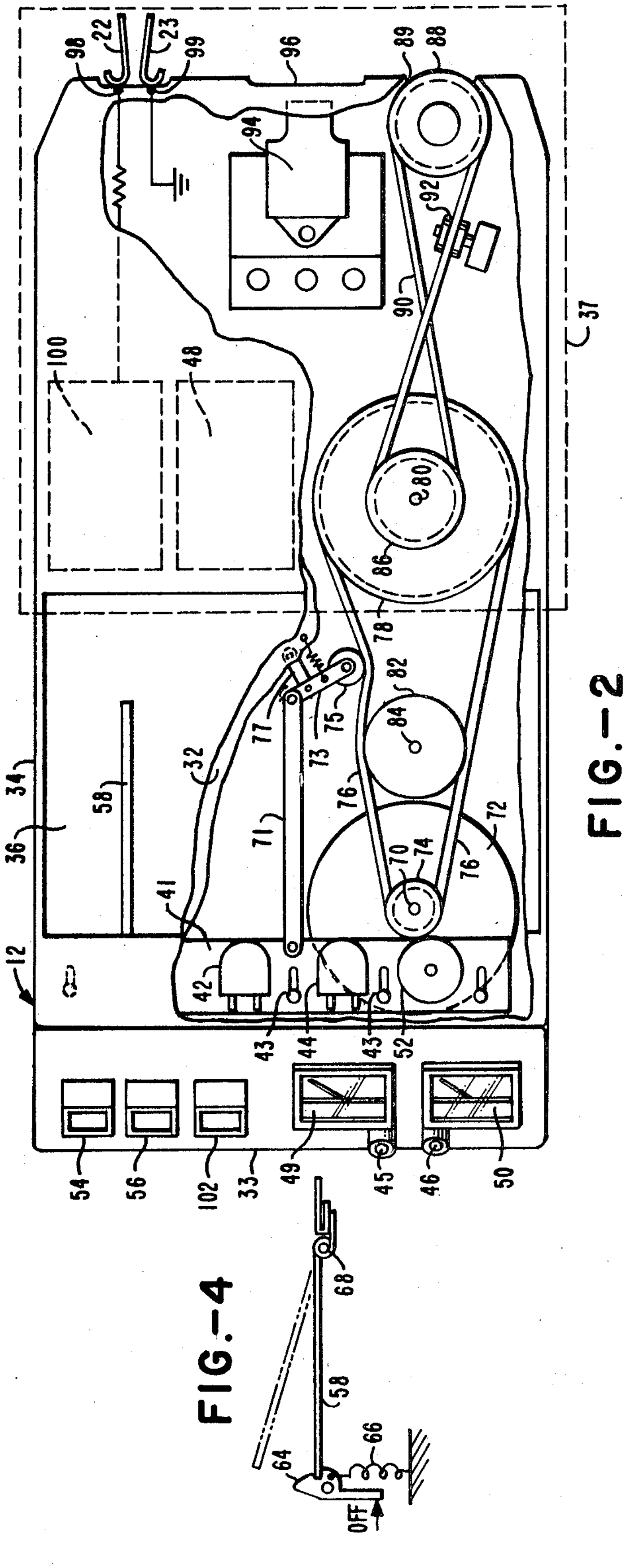
FIG. 2 is a plan sectional view of the cassette adapter unit of FIG. 1.
FIG. 4 is a schematic representation of a cassette removal device employed in the arrangement of FIGS. 1–3.
Figure 3:
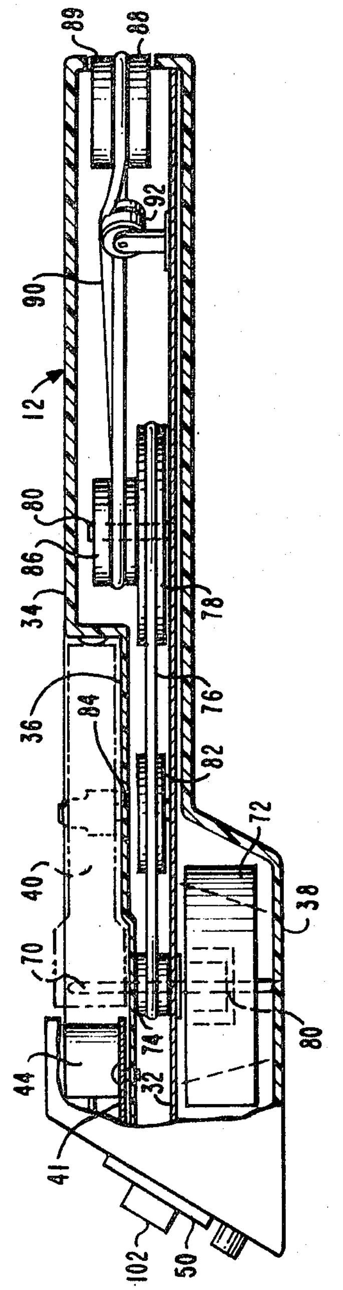
FIG. 3 is a side sectional view of the arrangement of FIGS. 1 and 2, and showing further details thereof.

An example of a system and adapter unit in accordance with the invention, referring now to FIGS. 1–3, incorporates a conventional cartridge playback unit 10, the housing for which is shown only in dotted line form inasmuch as the unit may be conventional. The unit includes a recess for receiving an endless loop tape cartridge, within which recess a portion of a cassette adapter unit 12 is receivable. The inserted portion conforms generally to the outline of a tape cartridge, although it may of course be smaller or have special configurations. Details of the playback unit 10, such as the locking mechanism or controls have been omitted to simplify the presentation, and only those elements of the playback unit which pertain to cooperation with units in accordance with the present invention have been illustrated. These comprise a drive motor 14 for the tape drive capstan 16, the motor 14 being energized from a drive source 18, such as the electrical system of a vehicle or a residential or commercial power source, with or without DC conversion depending upon the nature of the drive motor. The playback unit 10 also includes a playback head 20, assumed to be of the stereo type, disposed adjacent the path of a tape in a cartridge, and a pair of spring contacts 22, 23 connected in an electrical circuit with a power source 24, indicated symbolically. The spring contacts 22, 23 are normally maintained at a potential difference and the circuit is normally closed by a conductive strip demarcating the end of a recording in the continuous loop cartridge. The system further includes stereo amplifiers 26, conventionally including preamplifiers equalized for magnetic tape playback (not shown), and driving a pair of stereo speakers 28, 29.

The cassette adapter unit 12, through connections with these preexisting elements, obtains electrical and mechanical power. By transferring adapter playback signals to the existing playback system in a manner fully described below, the adapter gains the benefit of utilizing the existing speaker system. As best seen in FIGS. 2 and 3, the unit 12 includes an interior chassis 32 within an outer housing 34 upon which chassis elements are mounted. The rearward or insertable portion of the housing 34 corresponds generally to the size and configuration of an inserted tape cartridge portion. The unit also includes a protruding or forward portion extending forward, for example, of an automobile dashboard 37 (shown in dotted lines) and having a top recess 36 for receiving a cassette. A depending forward bottom portion 38, also defined by the unit, supports certain operative elements as described in detail below. The front margin of the housing 34 bordering the front side of an inserted cassette 40 (FIG. 3 only) has an upper surface lying flush with the remainder of the housing, and defines a forward cavity in which a cassette tape erase head 42, a cassette tape playback/record head 44, and a pinch roller 52 are mounted. These elements are best seen in the fragmentary view of FIG. 5. The heads 42, 44 and the roller 52 are mounted on a slidable panel 41 which slides on guide members 43 disposed in the interior chassis 32. A control panel 33 is defined by the front of the housing 34.

Referring again to FIGS. 1–3, the front panel and interior portions of the housing 34 include a pair of female connectors 45, 46 for receiving male connectors from stereo microphones (not shown), and coupling the signals therefrom into record preamplifiers 48 (indicated only in block form inasmuch as conventional transitorized circuits may be employed). In the record mode the cassette playback/record head 44 is driven from the record preamplifiers 48, and no connection to the existing cartridge playback system is made. Volume indicator meters 49, 50 mounted on the control panel 33, couple into the record amplifier circuits 48 in conventional fashion. The pinch roller 52 is disposed opposite to a pin-type cassette drive capstan 70 with respect to the length of cassette magnetic tape that is exposed when the cassette 40 is in operative position.

Referring again specifically to FIG. 5 along with FIGS. 1–3, an on/off switch mechanism comprising a pair of buttons 54, 56 on the front panel of the housing 34 is coupled to control actuation of the pinch roller 52. An arm 62 separates the sliding panel 41 and the on pushbutton 54. A spring 63 mounted between the sliding panel 41 and the control panel 33 maintains the sliding panel pressing against the arm 62 and the on button 54.

Figures 5, 6, 8:
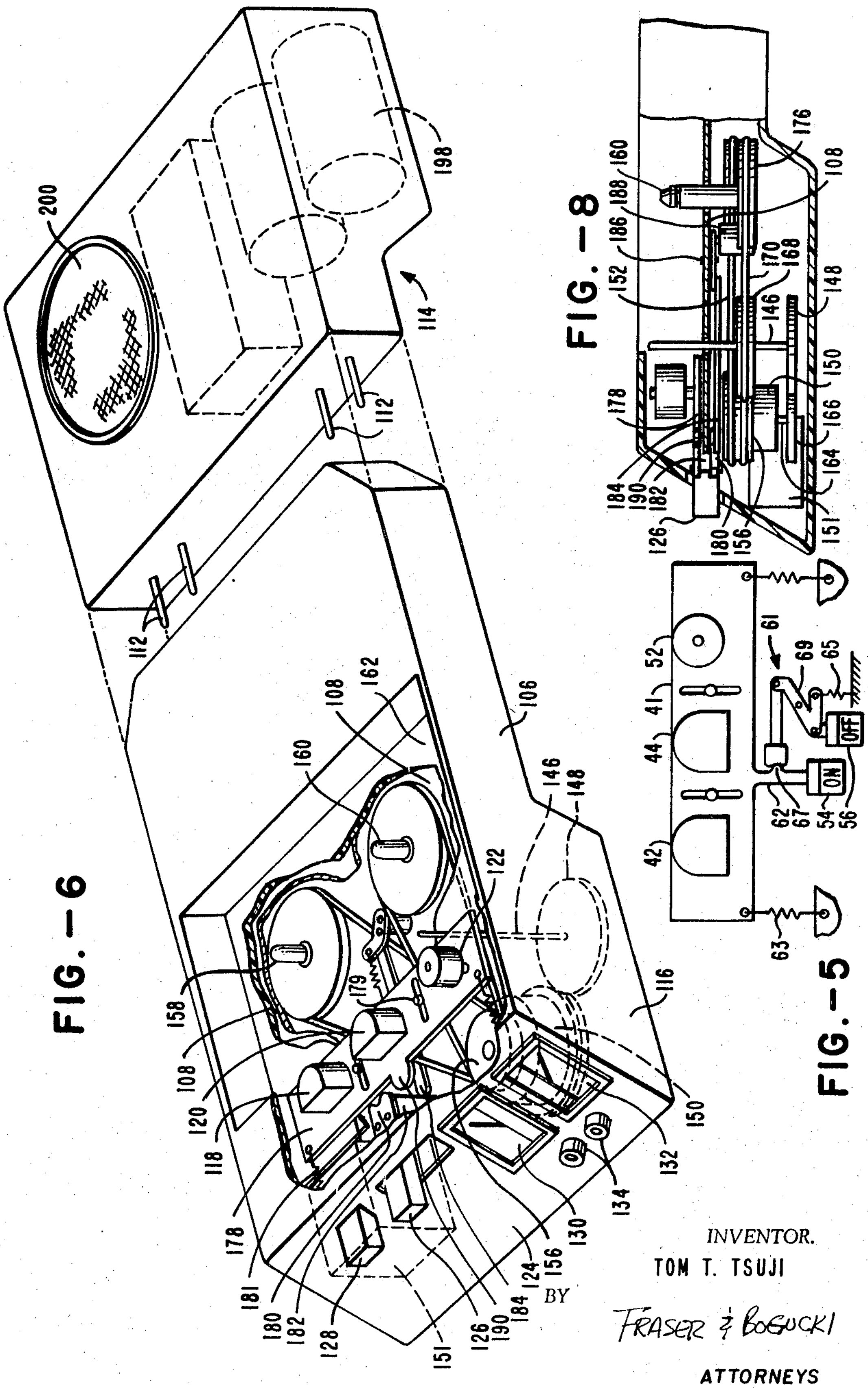
FIG. 5 is a schematic representation of an on/off mechanism employed in the arrangement of FIGS. 1–3.
FIG. 6 is a perspective representation, partially broken away, of another example of a cassette adapter unit in accordance with the invention.
FIG. 8 is a simplified side sectional view of the drive system of FIG. 7.

Referring specifically to FIG. 2, a belt tension roller arm 71 is attached to the slidable panel 41 at one end, and pivotally connected to a spring loaded bell crank 73 which pivots about a fixed element 77 on the chassis 32. The bell crank 73 supports a tension roller 75 at its free end, the roller 75 being normally positioned adjacent a drive belt 76 (described more fully below) which provides drive for the tape 40. The drive belt 76 is slack and thus provides no significant drive power unless the tension roller 75 is engaged with it to render it taut. When (as best seen in FIG. 5) the on button 54 and its arm 62 are pushed inwardly, the sliding panel 41 is thrust toward the cassette capstan 70. A detent-release mechanism 61 cooperates with the on-off pushbuttons 54, 56. The detent 61 and the off button 56 are connected through a bellcrank 69. When the on pushbutton 54 has been displaced sufficiently forwardly, a knob 67 engages a detent in the detent mechanism 61, and the on pushbutton in maintained in a displaced state under the influence of a spring 65 which biases the detent mechanism toward the arm 62. Under this displacement, the pinch roller 52 is thrust against the tape of the cassette 40 and the cassette capstan 70. The tension roller arm 73 is similarly also displaced rearwardly pivoting the tension roller 75 into contact with the belt 76 and tightening the belt to provide drive to the tape 40.

When the off button 56 is moved toward the sliding panel the bellcrank 69 pivots the detent mechanism 61 away from the knob 67, and the detent mechanism is disengaged from the arm 62. The sliding panel 41 then returns to its original position by the spring 63 action thus disengaging the pinch roller 52 from the cassette capstan 70.

A cassette release lever 58 (see FIGS. 1, 2 and 4) releases the cassette upon actuation of the off pushbutton 56. A release detent mechanism 64 including a spring 66 is disposed in cooperative relationship between the cassette release lever 58 and the off pushbutton 56 mechanism. A spring 68 coupled to a pivoted end of the cassette release lever 58 normally urges the free or forward end of the release lever 58 upwardly. Upon insertion of the cassette 40, however, the free end of the release lever 58 is forced downwardly to engage a detent in the detent mechanism 64, which thereafter holds the release lever 58 down under action of the biasing spring 66. Actuation of the off pushbutton 56 pivots the detent mechanism 64, however, to release the free end of the release lever and to lift the forward edge of the cassette 40 upwardly for easy handling.

The cassette capstan 70 is rotatably mounted in the chassis 32 adjacent the pinch roller 52, to be received in conventional fashion within the appropriate recess in the cassette 40. The interior end of the pin-type capstan 70 is coupled to a speed stabilizing flywheel 72 within the depending forward portion 38 of the housing 34. Intermediate the flywheel 72 and the engagement point on the capstan 70, the capstan assembly includes a pulley 74 about which the drive belt 76—here a rubber belt—is mounted. The opposite end of the drive belt is wrapped about an idler roller 78 having a relatively large diameter of selected size and rotatably mounted on a shaft 80 journaled in the chassis 32. The size and position of the relatively large idler roller 78 are selected to pass the drive belt 76, under the influence of the tension roller 75, in limited-slip frictional relation to a takeup spindle drive pulley 82 coupled to the takeup spindle 84. The spindle 84 is rotatably mounted at its interior end in the chassis 32, and protrudes outwardly to engage the hub aperture in an inserted cassette 40. Slippage of the belt 76 upon the pulley 82 provides substantially constant tension for winding. In addition or alternatively, a conventional felt clutch (not shown) may be incorporated in the mechanism to provide a limited slip function.

The idler roller 78 is connected by a second idler roller 86 mounted on the same shaft and driven from an exposed pressure roller 88 disposed adjacent a peripheral aperture 89 in the housing 34. The pressure roller 88 is frictionally engaged with the drive capstan 16 of the preexisting tape playback system 10. The size relationship between the first idler roller 78 and the second idler roller 86 provides a proper speed at the capstan 70 by maintaining an appropriate relation between rotation of the pressure roller 88 and rotation of the capstan 70. Rotation in the proper direction is achieved by crossing over a second drive belt 90 which is maintained under tension and separated at the crossover point by a snubber roller 92.

The peripheral aperture 89 for the exposed pressure roller 88 is disposed in a corresponding position to that employed in a tape cartridge of the eight-track type. This type of unit incorporates its own drive capstan as an element within the system. With the four-track type of cartridge, a pivoted preexisting pinch roller is utilized, and as will be evident to those skilled in the art the present configuration may be modified so as to engage this pinch roller.

Other apertures in the periphery of the housing 34 at the rearward or inserted end permit cooperation between other system units. A transducer 94 for playback signals is disposed adjacent a central aperture 96 which is opposite the preexisting playback head 20. The transducer 94, which may be monaural but is assumed here to be of the stereo type, includes a substantially central core and an encompassing coil for each of the stereo channels to establish a fringing magnetic flux intersecting the gap in the playback head. At a third aperture 97 in the housing 34, a pair of terminals 98, 99 responsive to the buttons 54, 56 through conventional means (not shown) are positioned to engage the spring contacts 22, 23 and provide a path for electrical energization of the record amplifiers 48 and playback preamplifiers 100 which interconnect the cassette-type playback/record head 44 with the stereo transducer 94 during playback.

Consequently, in the operation of the system of FIGS. 1–5, the cassette adapter unit 12 need only be inserted in the recess within the cartridge playback unit 10 and a cassette 40, placed in the top recess in position relative to the takeup spindle 84 and the pin capstan 70. A mode selector button 102 is operated to switch to the record or playback modes, as desired. Electrical connection between the playback/record head 44 and the playback and record circuits is achieved by a double switch 103 (FIG. 1) responsive to the position of the mode selector button 102. The erase head 42 connects to erase circuitry 101 by an erase switch 105 (FIG. 1) which is responsive to the mode selector 102 and closes when the unit is in the record mode. When the on-button 54 is depressed, the unit is energized and slidable panel 41 thrusts the pinch roller 52 against the tape and the capstan 70, driving the tape. Recording or playback may continue until it is desired to remove or reverse the cassette 40. An end of tape sensor of any conventional form (not shown) may alternatively be employed. In addition, it may be desired to employ a head switching arrangement so as to utilize recording on different tracks, particularly if only single track recording is to be utilized.

During playback the signal from the cassette tape playback head is effectively coupled into the preexisting playback head 20 after passage through the playback preamplifier circuits and energization of the transducer 94. When it is desired to remove the cassette 40, or to terminate the drive, the off-button 56 is depressed. Depression of the off-button retracts the sliding panel 41 to its original forward position and breaks the electrical path through the terminals 98, 99 by conventional switching means (not shown). The movement of the plate disengages the pinch roller 52 from the cassette capstan 70 and displaces the tension roller 75 from the drive belt 76. At the same time, the cassette release lever 58 is displaced and lifts the forward edge of the tape cassette 40 upward for easy removal.

When the adapter unit 12 is in position in the recess 36, the forwardly extending portion protrudes only a relatively few inches; thus, the adapter unit does not occupy undue space or introduce any significant obstruction when installed, for example, in an automobile. The top-loading feature provides ready and convenient handling of the cassette units. Through the use of this arrangement, the usefulness of an existing cartridge-type system is greatly increased at low cost without the necessity of structural modification. A number of modifications will nonetheless present themselves to those skilled in the art, including the incorporation of an internal battery source within the housing, if desired, and limited modifications to the preexisting unit, such as the employment of bayonet-type connectors for making electrical connections.

Figure 7:
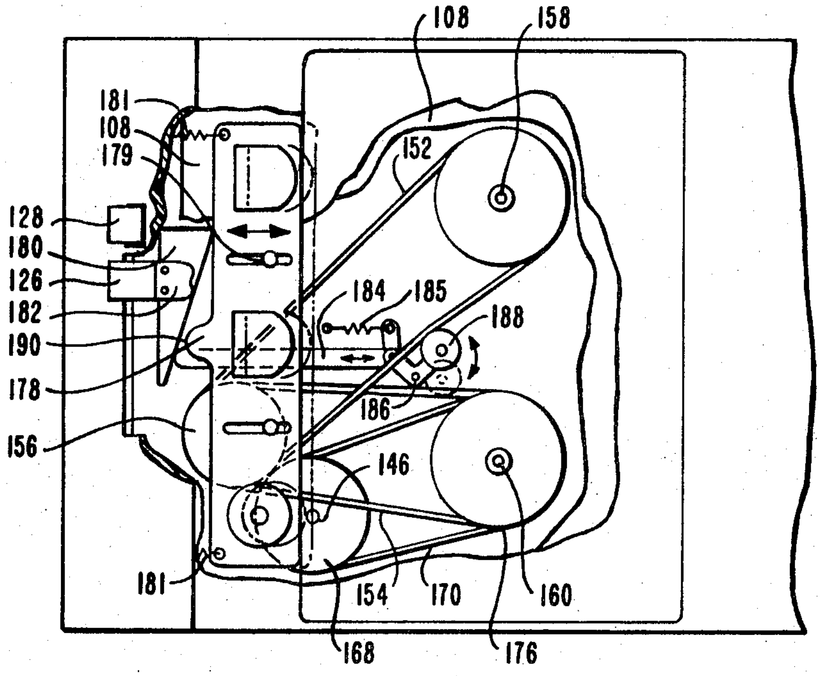
FIG. 7 is a simplified plan sectional view of a drive system in accordance with the invention.

Another example of an adapter unit in accordance with the invention is shown in FIGS. 6–8, to which reference is now made. Features, particularly electrical, which do not differ from those in the example of FIGS. 1–5 are omitted from FIGS. 6–8 for simplicity and brevity. An outer housing 106 includes an interior chassis 108. The outer housing 106 is similar in form to the outer housing 34 of the embodiment of FIGS. 1 through 5, having a portion insertable into the cartridge receptacle of an existing tape cartridge system (not shown). The outer housing 106 differs, however, from that of the previous embodiment in that in its rear portion it includes a female connection (not shown) for receiving a male connection 112 of an optional battery and speaker pack 114 as described in detail below. As shown in FIG. 6 a front portion of the housing 106 defines a depending forward cavity 116 in which are mounted a cassette erase head 118, a cassette playback/record head 120, and a pinch roller 122. On a front panel 124 defined by the outer housing 106 is an array of control buttons and meters. A three-position switch 126 controls rewind and fast forward speeds in its two extreme positions and in its third position intermediate the two extreme positions cooperates with a record-playback button 128. Volume control meters 130, 132 are also arrayed on the front control panel 124. The operative functions of the control mechanisms are described in detail below.

The front panel 124 contains a pair of female connections 134. The housing 106 also contains conventional circuitry for connecting the female connectors and a received male connector from a microphone (not shown) to record preamplifiers (not shown). As in the previous example, no connection is made between the record means in the cassette adapter unit and any circuitry of the existing cartridge playback system. The housing 106 further includes a transducer (not shown), which couples output signals from adapter playback circuits to playback circuits of the existing cartridge tape player (not shown). Associated with the adapter playback circuits is a conventional connection (not shown) for connecting the output of the playback circuits to the battery pack 114.

A pin type capstan 146 is rotatably mounted in the chassis 108 adjacent the pinch roller 122. A speed-stabilizing flywheel 148 is affixed to the lower end of the capstan 146, and a DC motor 150 is mounted on the chassis 108 adjacent the forward end of the housing 106. The DC motor is connected to a conventional motor drive circuitry 151 for varying the polarity of the energizing signals for the motor. As best seen in FIGS. 7 and 8 belts 152, 154 are loosely connected between a reel drive pulley 156 of the DC motor 150 and supply and takeup reel spindles 158, 160, respectively. The spindles 158, 160 are mounted on the interior chassis 108 and extend through a top recess 162 which is somewhat rearward of the front portion of the outer housing 106. The recess 162 is configured to receive cassette tapes (not shown), and the spindles 158, 160 are positioned to engage the hubs of the inserted cassette tapes. On a drive shaft 164 (FIG. 8) of the motor 150 a drive pulley 166 is mounted in position frictionally to engage the flywheel 148.

The pin-type capstan 146 assembly includes a pulley 168 upon which a drive belt 170 is mounted. The opposite end of the drive belt 170 is connected with a takeup spindle drive pulley 176 associated with the takeup spindle 160. Substantially constant tension for winding tape on the takeup reel during record and playback is provided by a limited slip engagement of the belt 170 on the pulley 168. Limited slip engagement may be augmented or achieved by a felt clutch (not shown) comprising a dual pulley with an interposed felt layer, or other conventional means.

The erase head 118, the playback record head 120, and the pinch roller 122 are mounted upon a slidable panel 178, which is slidably constrained upon guide members 179 affixed to the inner surface of the housing 106 and normally forced forward by biasing springs 181. During normal playback and record the pinch roller 122 presses the tape from an inserted cassette against the capstan 146. During rewind and fast forward operation, the pinch roller 122 is disengaged from the capstan 146.

System operation is controlled by the switch 126 in a manner now described. Tape direction is controlled by the circuitry 151 which is responsive in a conventional manner (not shown) to the switch 126. As shown in FIG. 7, the three-position switch 126 is connected to ramp and plate cams 180, 182, respectively. A cam follower 184 attached to a biasing spring 185 slides along the cam 180 and connects rearwardly to a bellcrank 186. The bellcrank is pivotally mounted in the housing 106 and is affixed at its rearward end to a reel drive tension roller 188. The tension roller 188 swings through an arc in response to throwing of the three-position switch, contacting and tightening the takeup reel belt 154 when the switch is thrown to the fast forward position and contacting and tightening the belt 152 when the switch is in the rewind position.

Tightening of each belt 152 or 154 on its pulley causes the reel associated with the pulley to drive the tape held on the reel in the appropriate direction. In both modes, takeup is at constant tension because of the limited slip engagement of the belt (and the felt clutch, if used). Frictional drag on the reels effected by a felt clutch arrangement or other conventional means provides constant tape tension between takeup and trailing reels.

The intermediate record/playback setting of the three-position switch moves the plate cam 182 into position to engage a cam follower 190 which is connected to the sliding panel 178 while moving the cam 180 into a neutral position wherein the tension roller 188 is out of engagement with the belts 152, 154. In the middle position the cam and the connecting arm cooperate to thrust the sliding panel rearward to engage the pinch roller 122 with the drive capstan 146. The mode selector button 128 then activates circuitry (not shown) for playback or record. Detents (not shown) correspond to the three positions of the three-position switch 126 to hold the switch in position. Thus, provision is made for ready adjustment of the system among the fast forward, rewind, and playback/record modes of operation.

The possibility of switching among the various operation modes of the system makes the system particularly convenient for dictation recording and constitutes a great advantage of the system. For example, when the system is inserted in a conventional automobile tape playback cartridge system a person is able to dictate on the cassette adapter unit while driving. Also advantageous is the motor drive which provides steady operation without the flutter and consequent sound distortions to be expected from many systems utilizing more complicated belt drive arrangements. Direct drive of the flywheel itself permits better time base stabilization with a smaller flywheel.

A further advantage of the system inheres in its possibility of use with the battery pack 114 (FIG. 6). The battery pack contains a power source in the form of ordinary flashlight batteries 198 as well as a speaker system 200 of monaural or stereo type. When the battery pack is connected through female connections in the housing 106 to the adapter unit 104, the resulting system is a self-contained cassette playback and recorder unit with stereo capability. Thus, adapters in accordance with the invention comprise highly versatile and flexible playback and record means usable in conjunction with an existing, relatively limited capability stereo tape cartridge system or in conjunction with a battery pack as an independent unit.

The system may be required to fit into a relatively confined space — below and behind an automobile dashboard, for example, and systems in accordance with the invention are particularly advantageous, because of their compactness. The motor 150 is small and is mounted on the same shaft as the drive pulley 156 adjacent the cassette capstan flywheel 148 which it drives. The arrangement of the motor and drive elements conserves space in its avoidance of extra transmission elements such as gears and clutches. The associated pulley and flywheel are very thin and small in area. The on/off switch 126 and associated mechanisms are also arranged and constructed for economy of space. The cams 180, 182 are thin and adjacent one another. The tension roller 188 and bell crank 186 are arranged so that only a short path is traversed by the roller between its two extreme, belt-tightening positions. The on/off switch and its cams also have only a relatively short path between extreme positions. The slidable panel is thin and of limited area; its motion is also of comparatively limited extent because of the proximity of the pressure roller 122 and the capstan 146. The absence of playback components and circuitry results in substantial conservation of space. Thus, all elements of the system are constructed and arranged to achieve maximum efficiency in utilization of available space.

Figure 9:
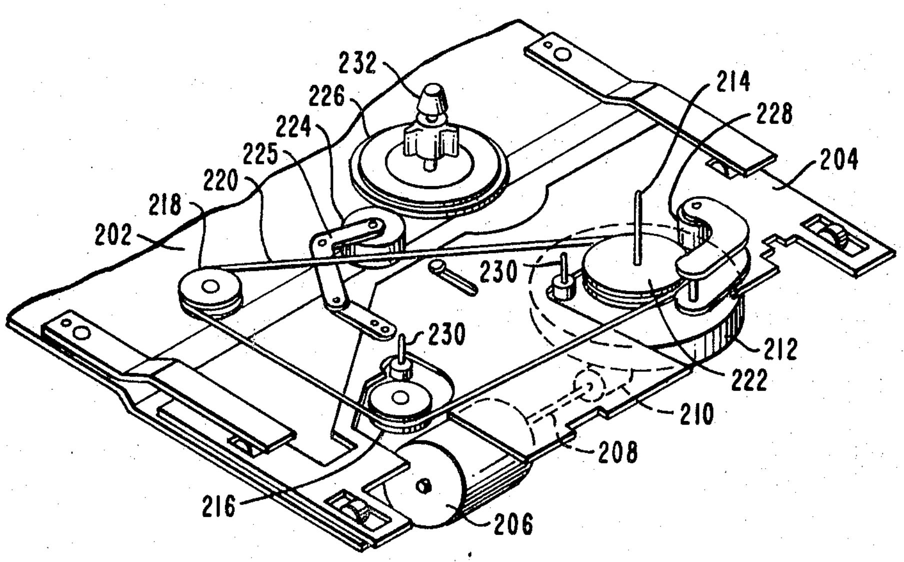
FIG. 9 is a perspective, fragmentary view of another example of a cassette adapter system in accordance with the invention.

FIG. 9 illustrates a portion of an interior chassis 202 and a sliding plate 204 portion of a cassette adapter unit in accordance with the invention. This portion of a cassette adapter unit is analogous to such portion in the examples of FIGS. 1–8. The present example may differ in substantially from the forms previously illustrated in FIGS. 6–8 in all respects except in its drive mechanism. The configurations of the previous figures are assumed, and only those aspects of the construction which differ between FIGS. 6–8 and FIG. 9 will be described in detail.

A thin, narrow, cylindrical DC motor 206 is placed at the forward end of the interior chassis 202, with its longitudinal axis directed laterally across the width of the interior chassis. A drive shaft 208 with a drive roller 210 extends from the motor along its longitudinal axis. The drive roller 210 is fixed, although it may be movable with or along the shaft and motor, and makes frictional contact with a flywheel 212 mounted upon a shaft of a cassette capstan 214. An on/off switch (not shown) controls the position of the drive shaft 210 by conventional means (not shown). The cassette capstan 214 is disposed in the interior chassis 202 laterally with respect to the DC motor 206. An idler roller 216 is disposed in the interior chassis on the same side as the DC motor. A second idler roller 218 is mounted in the interior chassis to the rear of the first idler roller 216. A belt 220 connects the idler rollers 216, 218 and a drive pulley 222 on the cassette capstan 214. Thus, the belt substantially is of a form of a right triangle whose hypotenuse extends between the second idler roller 218 and the drive pulley 222. A tension roller 224 is affixed to the slidable panel 204 by a bellcrank 225. The panel 204 is responsive to the on/off switch through conventional means (not shown).

Responsively to activation of the system through the on/off switch the drive roller frictionally contacts the flywheel 212, rotating the capstan drive pulley 222. Responsively to activation of the on/off switch, the tension roller 224, which is disposed between the belt 220 and a takeup reel pulley 226 when the unit is not in operation, is thrust into contact with the belt 220 and the takeup reel pulley 226, by rearward displacement of the slidable panel 204 and pivoting of the bellcrank 225. When the tension roller 224 is in this position, it transmits power from the belt 216 to the takeup reel pulley 226. In this manner, the takeup reel is driven to pull tape from an inserted cassette (not shown).

A tape pressure roller 228 is mounted upon the slidable panel 204 and is positioned to press a segment of an inserted tape cassette against the cassette capstan 214 upon activation of the on/off switch. Cassette positioning pins 230 are affixed to the interior chassis 202 and extend upwardly through slots in the slidable plate 204 to engage similarly placed apertures in an inserted tape cassette. A takeup reel spindle 232 extends through the center of the takeup reel pulley 226 upwardly to engage the hub of an inserted cassette.

Substantially all of the structure illustrated in FIG. 10 is contained within a depending lower forward portion of a housing (not shown) of a cassette adapter system analogous to those illustrated in FIGS. 6–8. In this embodiment of the invention, as in all the others, economy of space is a significant requirement. The structures and arrangements of the system of FIG. 9 are aimed at achieving this economy. The motor 206, for example, is housed in a cylindrical structure of small longitudinal and radial dimensions, which is mounted with its longitudinal axis in the direction of the flywheel 212 so as to minimize the extent of the drive shaft 208. The drive shaft 208 is thus relatively short. The drive roller is of a cylindrical shape and of very small longitudinal and radial dimensions. The flywheel 212 and the pulleys 222, 226, 216 are of small area and thickness, as are the tension roller 224 and its associated bellcrank 225. The slidable plate is fabricated to be as thin as possible consistent with structural integrity, and its associated pressure roller 228 is disposed upon it in proximity to the capstan 214 so that the motion of the slidable plate to bring the pressure roller and capstan into contact is of minimum extent. The relationship between the motor 206 and the flywheel 212 avoids complicated and bulky additional transmission elements including gears and clutches. The single belt arrangement is both simple and compact. The transmission arrangement between the takeup spindle and the belt also avoids needless complexity and bulk. Playback components and circuitry are absent, thus furthering system compactness. Thus, the structures and configuration of the system of FIG. 9 result in highly efficient utilization of available space.

The speed of rotation of the flywheel 212 may be varied by varying the position of the drive roller 210 with respect to the longitudinal cylindrical axis of the flywheel 212. Thus, by appropriate placement of the drive roller a fast forward mode of operation of the unit may be achieved. A reversal of polarity of the motor with the drive roller in its orientation provides a rewind mode of operation. Conventional means (not shown) such as a felt clutching arrangement of the conventional type mentioned above may be employed to maintain constant tension between the capstan driving pulley and the driven takeup and supply reel pulleys and between the tape reels on the takeup and supply reel spindles. The system is adaptable in this manner to use as a record or dictation machine with all the advantages of convenience and time-saving enjoyed by such a device as discussed in connection with the system of FIGS. 6–8. The motor drive of this example of a system in accordance with the invention provides steady system operation with the resultant advantages discussed above in conjunction with the example of FIGS. 6–8.

The system and structures discussed above are not to be construed to define the limits of the invention; rather, the invention is to be considered to embrace all equivalent structures and systems and those differing insubstantially from the described and depicted structures and system.

What is claimed is:

1. An adapter unit for playing and recording on cassette tapes in a preexisting tape cartridge playback system having a receptacle to receive a conventional magnetic tape cartridge, a magnetic playback head, a speaker-amplifier and associated circuits, drive means for passing a tape from an inserted tape cartridge in playback relation with the playback head, and electrical potential establishing means and comprising:

a housing means having a rear portion configured to fit within the receptacle of the preexisting cartridge player and having a depending forward portion;

means disposed in said housing for receiving a cassette tape unit, said means including a top cassette insert surface, takeup reel spindle means and supply reel spindle means, said spindle means extending through said surface;

cassette tape drive capstan means extending through said cassette insert surface and including flywheel means disposed within said depending portion of said housing, said capstan means providing power to said takeup reel spindle during cassette playback;

drive motor means including drive shaft means disposed within said depending forward portion of said housing and connected to said flywheel means to provide drive to the drive capstan means;

transducer means positioned within said housing to couple magnetically the existing tape system playback head and a playback magnetic head means of said adapter unit;

magnetic head means and associated circuitry disposed in said housing for playing back cassette tapes, said takeup reel and supply reel spindle means cooperating to pass cassette tape in magnetic relationship with said head means; and energizing means disposed within said housing for energizing said adapter unit, said energizing means including contacts for connecting said electrical potential establishing means with the adapter unit to supply electrical power thereto.

2. The invention as set forth in claim 1 further including means coupling said drive shaft means and said takeup spindle means to drive the takeup reel spindle in the direction of takeup only during operation of the adapter in a fast forward mode and further including means coupling the drive shaft means with the supply reel spindle only during operation of the adapter unit in a fast rewind mode to drive the supply spindle in a rewind direction.

3. The invention as set forth in claim 1 further including magnetic head means and associated circuitry disposed within said housing for recording on cassette tape.

4. The invention as set forth in claim 3 further including pinch roller means slidably mounted in said housing to engage a cassette tape with the capstan means only during recording and playing back of cassette tapes.

5. An adapter unit for playing cassette tapes in a preexisting tape cartridge system having playback means including a playback magnetic head and associated circuitry in operative relationship to a receptacle for receiving a tape cartridge, and energizing means, and comprising:

a housing unit having a rear portion configured to fit within the preexisting receptacle of the cartridge player and having a depending forward portion;

means disposed in said housing for receiving a cassette tape unit, said means including a cassette insert surface, takeup reel spindle means extending through said surface;

cassette drive capstan means disposed within the forward depending cavity of the housing and extending through the cassette insert surface, the cassette capstan means including flywheel means and pulley means;

first idler roller means disposed laterally across the depending front portion from the cassette pulley means;

second idler roller means disposed rearwardly from the first idler roller means;

belt means mounted upon the capstan pulley means, the first idler means, and the second idler means;

pressure roller means engagable with the cassette capstan means when the unit is operating;

transmission means for coupling the belt means to a takeup reel pulley;

takeup reel pulley means associated with the takeup reel spindle means;

magnetic head means and associated circuitry for playing back and recording on cassette tapes passed in operative relation to the magnetic head means by the takeup spindle means;

transducer means positioned in said housing to couple magnetically the cassette magnetic head means with the preexisting tape playback means when the adapter is inserted in the tape receptacle;

drive motor means disposed within the depending forward portion of the housing including means driving the capstan flywheel means in a forward direction;

and contact means within said housing electrically connecting the tape cartridge energizing means with the adapter to energize the adapter when the adapter is inserted in the tape cartridge receptacle.

6. The invention as set forth in claim 5 wherein the drive motor means includes a narrow, thin, cylindrical housing, a drive shaft connected to the motor and extending from the housing, and a drive roller mounted on the end of the drive shaft, said drive shaft being positioned to engage frictionally the flywheel means.

7. The invention as set forth in claim 5 wherein the transmission means between the belt and the takeup pulley comprises a third idler roller mechanism including a third idler roller and a movable member connected thereto to move the third idler roller into frictional engagement with the belt means and the takeup reel pulley means for supplying drive to said takeup reel pulley means, upon activation of the adapter unit.

8. An adapter unit for playing back cassette tapes in a preexisting tape cartridge system, said system including an electrical power supply, a magnetic playback head and associated circuitry operatively associated with an opening for receiving a tape cartridge, said adapter unit comprising:

a housing having a rear portion configured to fit within said opening of said tape cartridge system and an enlarged, depending forward portion;

a receptacle in said housing for receiving a tape cassette unit;

a takeup reel spindle projecting into said receptacle, said spindle having a pulley mounted thereon;

a rotatable capstan having an upper portion projecting into said cassette receptacle for driving the cassette tape and a lower portion projecting into said depending forward portion of said housing and including a flywheel attached to said lower portion and a pulley attached to said capstan between said upper and lower portions thereof;

a belt connecting said capstan pulley with said takeup reel spindle pulley;

a drive motor mounted in the depending forward portion of said housing and having a shaft connected to rotate said capstan in a playback direction;

pressure roller means engageable with said capstan when the unit is in operation;

a magnetic head and associated circuitry for playing back said cassette tape;

transducer means positioned in said housing for magnetically coupling the cassette magnetic head with the preexisting tape playback means when the adapter is inserted in the tape opening; and contact means within said housing for electrically connecting the tape cartridge power supply with the adapter to energize said adapter when the adapter is inserted in the tape cartridge opening.

* * * * *